Sept. 24, 1963 S. ASHENFARB 3,105,136
HEAT EXCHANGE SYSTEM AND HEATING ELEMENT THEREFOR
Filed Feb. 2, 1960 2 Sheets-Sheet 1
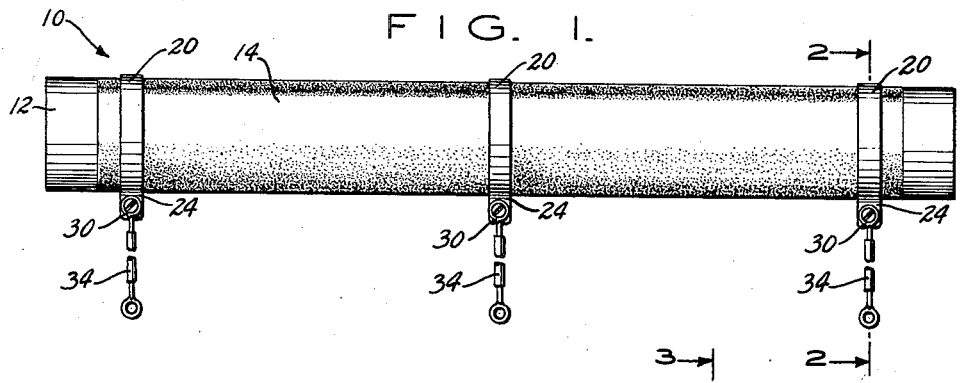
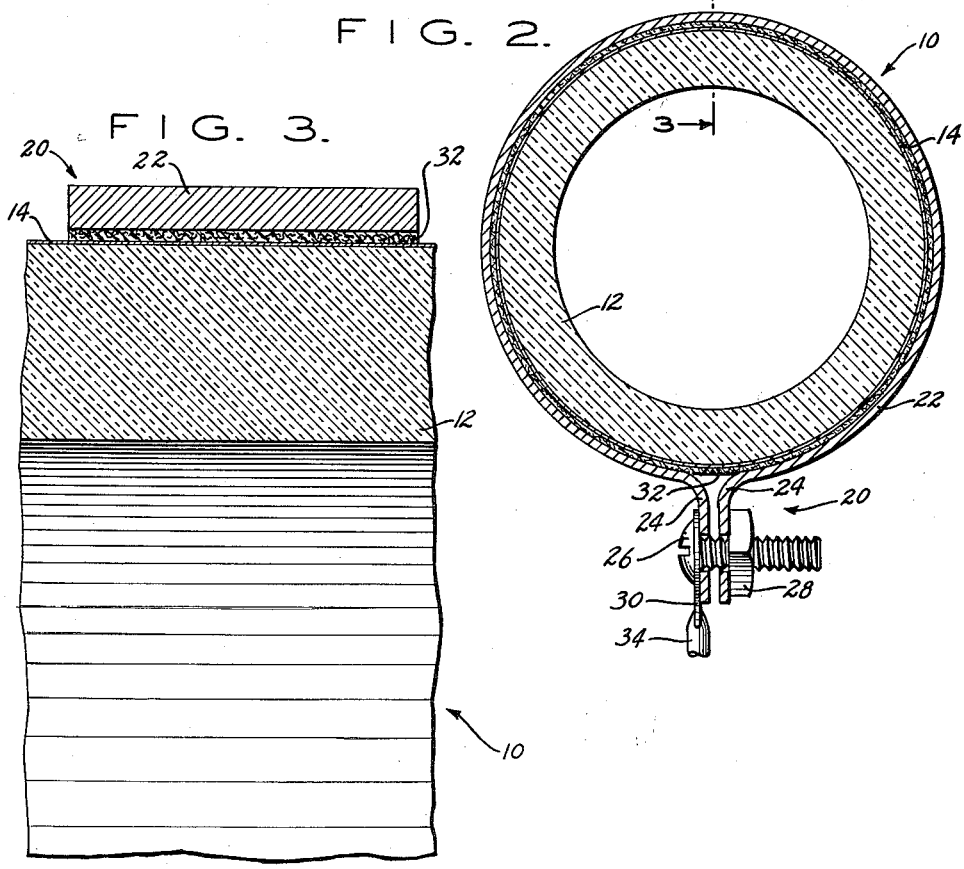
INVENTOR.
SAMUEL ASHENFARB Sept. 24, 1963   S. ASHENFARB   3,105,136
HEAT EXCHANGE SYSTEM AND HEATING ELEMENT THEREFOR
Filed Feb. 2, 1960   2 Sheets-Sheet 2
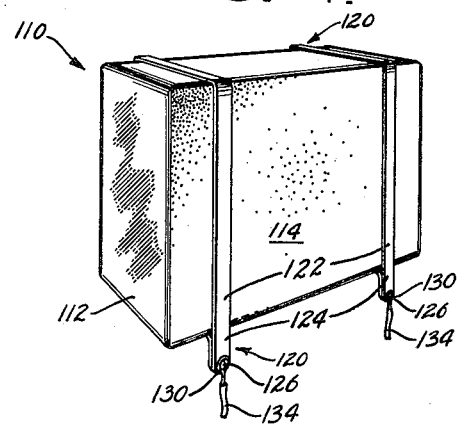
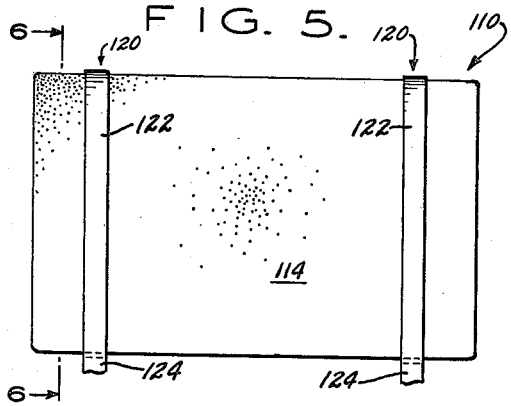
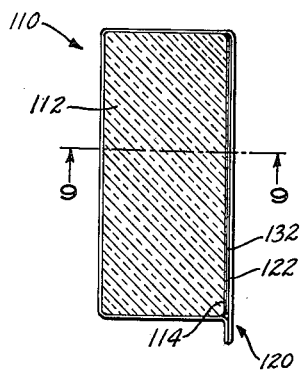
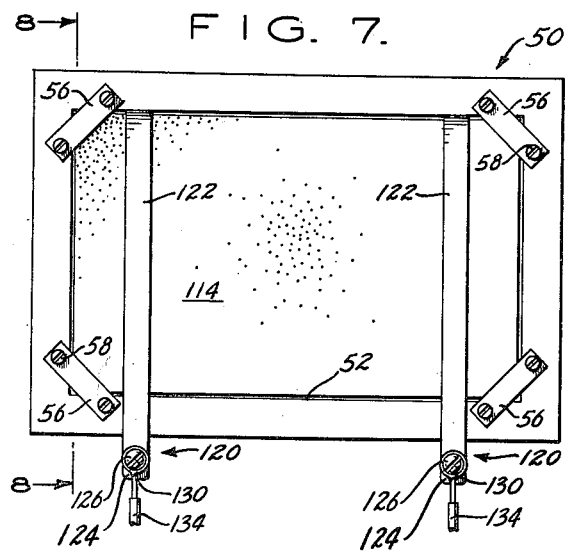
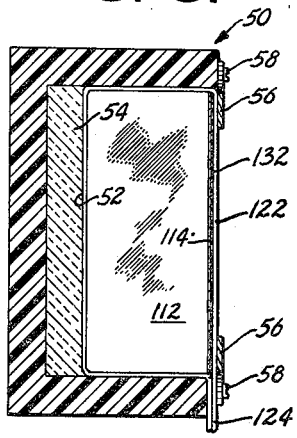
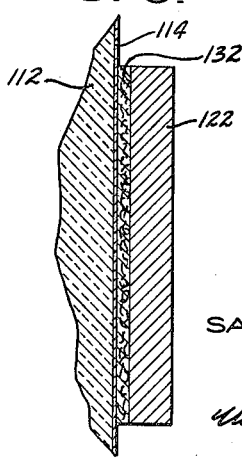
INVENTOR.
SAMUEL ASHENFARB
BY
*Morgan, Finnegan, Durham & Pine*
ATTORNEYS

United States Patent Office 3,105,136
Patented Sept. 24, 1963

3,105,136
HEAT EXCHANGE SYSTEM AND HEATING ELEMENT THEREFOR
Samuel Ashenfarb, Great Neck, N.Y. (% Vacoat Corp., 68 Newmans Court, Hempstead, N.Y.)
Filed Feb. 2, 1960, Ser. No. 6,294
13 Claims. (Cl. 219—34)

This invention relates to heat exchange systems and heating elements therefor.

More particularly, the present invention relates to heating elements which achieve uniformity of heating by providing a novel resistance element which provides for a uniform current distribution between any two or more points thereon. With the novel heating elements, it is possible to achieve an economical, efficient and variable energy level heat exchange system. It will therefore be evident from the following description of my invention that there is no restriction on the size of the heating elements or the number of levels of energy output of each heating element.

With present day heating elements and heat exchange systems, one of the primary problems is the accurate determination of different levels of energy output of each heating element. Consequently, the ability to alter the level of energy output of each heating element and thereby the level of energy output of the heat exchange system in a uniform manner is of paramount importance where a true and accurate control is desired.

In order to solve the aforesaid problems, I propose to provide a heating element which generally comprises a "Pyroceram" core or plate which is a glass ceramic or refractory material having high heat transfer properties and high electrical resistance. A chromium-nickel alloy is then vacuum deposited in a fine layer of about 0.000004 to 0.000005 inch about the ceramic core or plate to cover the same and provide between any two points a resistor which varies uniformly and linearly therebetween. To provide means whereby the resistance between a given two positions on the chromium-nickel coated core or plate may be obtained and to provide means whereby the two positions may be changed so as to increase or decrease the resistance therebetween in a uniform and constant manner, the present invention proposes that a clamp device be used which is effective to provide a complete surface contact with the chromium-nickel alloy and which may be moved to change the position thereof and change the resistance in a uniform manner. The clamp device generally includes a clamping element having any suitable tightening and loosening mechanism and a layer of steel or copper wool or other suitable equivalent shredded electrically conductive material which is placed between the aforesaid clamping element and the chromium-nickel layer to provide a uniform and constant contact between the clamping element and the chromum-nickel layer. Where a plate element rather than a core of the tube type is employed, it is sufficient for certain purposes to vacuum deposit the chromium-nickel alloy solely on one surface of the plate element.

As will be explained hereinafter more fully, the problem of placing leads or clamping devices onto the chromium-nickel surface without silver soldering to provide uniform and continuous contact when fixed in position and the position of which is readily and facilely alterable while at the same time changing the resistance between any two clamping devices has been solved with the present invention. Hence, the heating element is operable at more than one energy level and changes in the energy levels is accomplished in a uniform manner. It will also be evident that the heat exchange system possesses a high degree of control in the energy levels thereof not attainable with the systems known heretofore.

In the heat exchange system according to the present invention, there is provided circulating water in the ceramic core which is heated by the energization of the resistance element thereon to provide water with the necessary heat to be applied to a suitable radiation system. A modification of the aforesaid heat exchange system proposes the use of a ceramic plate having coated thereon the chromium-nickel alloy resistor which is usable as a space heater or radiant heating panel and thereby avoids the necessity of heating internal circulating water. It will be evident that the same considerations of control apply to space heaters as with circulating water heating systems.

It is therefore a primary object of this invention to provide heat exchange systems which is effective to operate the heating elements at more than one energy level.

A further object of this invention is to provide heating elements having a plurality of parallel electrical paths which are uniformly coupled to a source of electrical energy to provide uniform current distribution in each of the parallel electrical paths.

Another object of this invention is to provide an electrical heating element for use in heat exchange systems with means to alter the electrical relationship in a linear manner to obtain exactitude in the amount of heating provided by the heating element.

Yet another object of the present invention is the provision of an improved heating element for a heat exchange system of the above character which is of simple design and construction, economical to manufacture and highly efficient in the accomplishment of its intended purpose.

The objects, advantages, and nature of the invention will be more fully understood from the following description of the preferred embodiments of the invention, shown by way of example, in the accompanying drawings, in which:

FIGURE 1 is a diagrammatic view of one embodiment of the heating element for the heat exchange system;

FIGURE 2 is a longitudinal view partly in section taken on line 2—2 of FIGURE 1;

FIGURE 3 is a sectional view taken on line 3—3 of FIGURE 2;

FIGURE 4 is perspective view of another embodiment of the heating element for the heat exchange system;

FIGURE 5 is a front view of the heating element of FIGURE 4 with the electrical application means omitted;

FIGURE 6 is a side view taken in section on line 6—6 of FIGURE 5;

FIGURE 7 is a front view of the heating element of FIGURE 5 illustrated in position as a wall unit;

FIGURE 8 is a side view taken in section on line 8—8 of FIGURE 7, and

FIGURE 9 is a partial sectional view taken on line 9—9 of FIGURE 6.

In order to simplify the drawings, portions of the apparatus not essential to an understanding of the invention have been omitted, it being understood that the invention is applicable to heat exchange systems employing a plurality of the heating elements shown. The drawings illustrate the best modes now contemplated by me for carrying out my invention, and similar characters of reference indicate corresponding parts in all of the figures.

Referring now more particularly to FIGURES 1–3, heating element 10 generally comprises a glass ceramic tubular base 12 having a chromium-nickel alloy resistance material 14 vacuum deposited thereon to form a continuous and uniform layer having a depth of about 0.000004 to 0.000005 inch. For ceramic base 12, I prefer to use "Pyroceram" which is obtainable from the Owens-Corning Company of Corning, New York. By vacuum depositing the aforesaid alloy resistance material 14 the uniformity and continuity of the coating is obtained.

Coupled to the heating element 10 are three clamping devices 20 which include an outer clamping element 22 having a pair of flange members 24 (FIGURE 2) provided with suitable apertures to receive a locking bolt 26 which is secured to the flange members by nut 28. Coupled to clamping element 22 at the flange members 24 are an electrical energy coupling member or plate 30 and conductor 34 to couple electrical energy to clamping device 20.

Interposed between clamping element 20 and the peripheral surface of the alloy resistance material 14 therebeneath is steel wool, copper wool or other suitable shredded metal 32 (FIGURES 2 and 3) to provide uniform and continuous electrical contact between clamping element 22 and resistance material 14. Material 32 is also preferably a good heat conductor, and for this purpose copper-wool is preferred.

While three clamping devices 20 have been shown, it will be evident that for certain purposes only two are necessary. It is also to be noted that clamping devices 20 are electrically coupled to resistance material 14, but mechanically isolated and separated therefrom.

When only two clamps 20 are used, it will be evident that electrical energy may be impressed upon the resistance material 14 through conductors 30, clamping devices 20 and shredded metal 32. A firm contact is made by shredded metal 32 to insure uniform and continuous contact with resistance material 14. It has also been found necessary in many applications to vary the heating effect of the resistance material and this is accomplished by altering the spacing between the clamping devices 20 to increase or decrease the length of the resistance path linearly. Since effective resistance varies directly with the length of the resistance material, a linear change in the length is effective to change the resistance linearly. In order to be certain that the resistance path is changed linearly, it is necessary for all of the individual paths between clamping devices 20 to be the same in quantity and for their length to be changed in a linear manner. The shredded metal 32 is effective to insure contact with all of the linear resistance paths disposed on the outer periphery of ceramic tube 12 and is further effective to insure contact with all of the linear resistance paths as the clamping devices 20 are moved to alter the effective length of the resistance paths. To alter the position of clamping devices 20, bolt 26 and nut 28 are loosened to facilitate movement of the clamping devices. While a bolt 26 and nut 28 are shown, it will be evident that any suitable locking means may be provided.

Where a third clamping device 20 is provided, this may be used in conjunction with one of the other clamping devices to tap off a portion of resistance material 14 and when a desired amount of heating energy is reached, the third clamping device 20 may be so wired as evident to one skilled in the art to either cut off the electrical energy or to decrease the amount of electrical energy to be supplied. The third clamping device 20 may therefore be used as part of the controls for the heat exchange system.

In the heat exchange system, it is possible to provide for the passage of circulating water which may be passed through tube 12 to heat the water. The heated water can then be conveyed through suitable piping to supply heat to other places. It is also possible to provide a plurality of heating elements 10 interconnected by suitable piping means so that water can be heated at different places in the system and thereby eliminate large differences in the heat energy supplied by the piping system and maintain a more uniform heating in the run of the piping system.

With the ability to alter each individual heating element by changing the position of clamping devices 20, it will be evident that an extremely accurate degree of control may be obtained. Hence, a central heating system would no longer be necessary, and it is possible to place the heating elements in any particular desired location to satisfy particular heating requirements. Since it is possible to place heating elements in different locations, the heat exchange surface of the heating elements may be operated at a lower temperature than electrical heating devices presently available. Also, since each heating element may be individually changed to alter the heating energy level thereof, different locations can be supplied with different quantities of heat without altering the heat quantity of one of the heating elements positioned in another location.

Referring now to FIGURES 4 to 9 of the drawings which illustrate a further embodiment of the invention illustrated in FIGURES 1 to 3, corresponding parts are designated by the same reference numerals with the addition of 100, heating element 110 is provided with a pair of clamping devices 120. While only two clamping devices are shown, it will be evident that three clamping devices may be used as mentioned heretofore in connection with FIGURES 1 to 3. Heating element 110, in this modification functions as a radiant heating panel, and is shown formed of a glass ceramic block 112 of the "Pyroceram" type which has at least one flat surface onto which is vacuum deposited a chromium-nickel alloy resistance material 114 having a thickness of about 0.000004 to 0.000005 inches.

Clamping devices 120 in this modification also include clamping element 122 having a pair of flange members or elements 124 provided with suitable apertures to receive a locking means such as bolt 126 which is secured to the flange members by a nut generally similar to nut 28, shown in FIGURE 3. Coupled to each clamping element 122 at the flange members 124 is an electrical energy coupling member or plate 130 and conductor 134.

As mentioned in connection with FIGURES 1 to 3, it is necessary to use shredded steel or steel wool 32 to provide uniform electrical contact between resistance material 14 and clamping element 22, and in the embodiment of FIGURES 4 to 9, steel wool or other suitable shredded material 132 is also interposed between clamping element 122 and resistance material 114 to provide a uniform and continuous electrical contact therebetween while maintaining mechanical isolation therebetween.

With the heating element 110 shown in FIGURES 4 to 6 and 9, it is evident that an aperture or opening may be provided to conduct water therethrough to be heated in a manner similar to the embodiment of FIGURES 1 to 3. However, the embodiment of FIGURES 4 to 6 and 9 also serves as a radiant heating panel and it may be hung on a wall an electrically connected to a source of electrical energy.

The heat element of FIGURES 4 to 6 and 9 may also be inserted into a wall to provide a permanent location, and it will be evident from the description which follows with respect to FIGURES 7 and 8 that the ability to move or change the position of the clamping level of heating element 110 is maintained. Heating element 110 is inserted into a wall 50 which is provided with a suitable opening 52 for the reception of the same. A suitable insulating material 54 is provided in the opening 52 to space heating element 110 and insulate the same to prevent the heat energy from escaping through the wall 50. Securing devices 56 shown in FIGURE 7 couple heating element 110 in position to wall 50. While four brackets are shown as the securing devices 56, it will be evident that any equivalent means may be used to secure and maintain heating element 110 within wall 50 while at the same time not interfering with the ability to alter the position of clamping devices 120 to alter the energy level of heating element 110. In the position shown, heating element 110 functions as a radiant heating panel.

It will be evident from the foregoing that the layer of metallic fiber, i.e. the steel wool, copper wool or other shredded metal 32 or 132 is positioned between the clamping devices 20 or 120 and resistance material 14 or 114. The clamping devices 20 or 120 may be loosened and slid or moved along the vacuum deposited chromium-nickel alloy resistance material 14 or 114 which is coated onto the refractory material, "Pyroceram" base 12 or 112 to select any appropriate resistance value. The clamping technique may be applied with equal facility to a hollow tube or flat plate without any restriction as to the size of the heating element or the number of levels of energy output of each heating element.

When a tubular heating element is used, it will be evident that the combination of the clamping devices 20, the shredded metal 32 and the resistance coating material 14 accommodate for any lack of uniformity circumferentially and longitudinally. In a similar manner when the refractory material is provided with at least one flat surface any non-uniformity in the coating material 114 is overcome with the use of the shredded metal 132. By taking care of any non-uniformity in the coating material, a continuous and uniform electrical contact is insured between the resistance material and the clamping elements for all positions thereof to ensure the maintenance of the same number of resistance paths between the clamping elements when the length therebetween of the resistance paths is altered to alter the energy level of the heating element. In the past, it was necessary to employ silver solder between the clamping devices and the resistance material to fix the clamping devices in position, and this procedure is not effective to provide a heating element in which the energy level can be changed with facility. With my invention, the correct resistance between any two points can be selected without in any way altering the structure.

While there has been shown what is at present considered to be the preferred embodiments of my invention, it is apparent that many changes and modifications may be made therein without departing from the invention, and it is, therefore, intended in the accompanying claims to cover all such changes and modifications as fall within the true spirit and scope of the invention.

What I claim is:

1. A heating element for a heat exchange system, comprising a ceramic base member, an electrical resistance heating coating material vacuum deposited on at least one surface of said ceramic base member, as a uniform thickness continuous coating providing, between any two points thereof, a resistance path whose effective resistance varies linearly with its length, a pair of clamping members coupled to said ceramic base movable along said coated surface of said base and having portions for applying electrical energy thereto, and shredded electrically conductive material interposed between each said clamping members and said resistance coating material to provide uniform uninterrupted electrical contact between all portions of said resistance coating material beneath each said clamping members and said clamping members for all positions thereof, to ensure the maintenance of the same number of resistance paths between the clamping members when the length therebetween of the resistance paths is altered to alter the energy level of the heating element, whereby to obtain uniform current distribution between said clamping members when electrically energized.

2. A heating element as claimed in claim 1, wherein said resistance coating material is a chromium-nickel alloy resistor coated as a layer on said ceramic base with a thickness of about 0.000004 to 0.000005 inch.

3. A heating element as claimed in claim 2, including release means to couple said clamping members tightly to said resistance material and releasable to change the position of said clamping members along the coated surface of said base, whereby to change the effective resistance between said clamping members.

4. A heating element as claimed in claim 3, wherein said ceramic base is a Pyroceram tubular element, said resistance coating material being coated on the outer periphery of said tubular element for providing a cylindrical resistor thereon and said clamping members being cylindrically shaped to provide said uniform contact with said resistance element through the intermediation of said shredded electrically conductive material.

5. A heating element as claimed in claim 3, wherein said ceramic base is a Pyroceram element having at least one substantially flat surface, said resistance coating material being coated on said flat surface for providing a flat resistor thereon forming a plurality of resistance paths, each said clamping members having at least one substantially flat surface complementary to said flat surface of said ceramic base and said shredded electrically conductive material being positioned solely between said flat surfaces to provide said uniform uninterrupted contact between said resistance material and said flat surface of said clamping members.

6. A heating element for a heat exchange system, comprising a ceramic base, a vacuum deposited electrical resistance heating material coated on said base in a uniform thickness coating providing, between any two points thereof, a resistance path whose effective resistance varies linearly with its length, and means electrically coupled to said resistance heating material for supplying electrical energy thereto including a pair of clamping members coupled to said base and movable along said coating, a layer of copper wool interposed between each said clamping member and said resistance heating material for providing uniform and continuous electrical contact between each said clamping member and all portions of said heating material beneath each said clamping member, for all positions of said clamping members to ensure the maintenance of the same number of resistance paths between the clamping members when the length therebetween of the resistance paths is altered to alter the energy level of the heating element, and coupling means for each said clamping member firmly, but slidably, coupling each said clamping member to said base and adapted to receive electrical energy to be applied to said resistance material, said layer of copper wool for each said clamping members providing uniform current distribution through said resistance material when electrical energy is applied to said clamping members.

7. A heating element as claimed in claim 6, including an additional clamping member and copper wool coupling said additional clamping member to said base, said additional clamping member being coupled in circuit with said other clamping members to control the electrical energy supplied thereto.

8. A heating element as claimed in claim 7, wherein said clamping members are movable linearly across said base to vary the current distribution between each two of said clamping members uniformly and linearly.

9. A heating element as claimed in claim 8, wherein said base is a Pyroceram tube with said resistance heating material coated on the outer periphery thereof.

10. A heat exchange system for circulating hot water system, comprising a heating element for heating the hot water of the system, said heating element including a Pyroceram tube having a hollow interior adapted to have the water of the hot water system circulated therethrough for heating thereof, an electrical resistance heating coating material vacuum-deposited on the outer periphery of said tube as a uniform thickness continuous coating providing, between any two points thereof, a resistance path whose effective resistance varies linearly with its length, means for supplying electrical energy to said heating element to heat the water, said electrical energy supplying means comprising a pair of clamping members coupled to said tube and movable along the coated outer periphery of said tube and having portions for supplying electrical energy thereto, shredded electrically-conductive material interposed between each said clamping members and said resistance coating material to provide uniform uninterrupted electrical contact between all portions of said resistance coating material beneath each said clamping members and said clamping members for all positions thereof, to ensure the maintenance of the same number of resistance paths between the clamping members when the length therebetween of the resistance paths is altered to alter the energy level of the heating element, whereby to obtain uniform current distribution between said clamping members when electrically energized and means coupled to said tube and responsive to the heating thereof to control the electrical energy supplied thereto.

11. A heat exchange system as claimed in claim 10, wherein said shredded electrically-conductive material is steel wool, and including coupling means connected to said clamping devices for coupling thereto said electrical energy and effective when operative for altering the position thereof on said tube.

12. A heat exchange system as claimed in claim 11, wherein said control means includes a third clamping element, said steel wool electrically coupling said clamping element to said tube about the peripheral surface thereof at a point intermediate said clamping devices and means coupled to said clamping element to permit the position thereof to be altered.

13. A heat exchange system comprising a radiant heating panel, said panel including a Pyroceram base element, said base element having a facing surface, a chromium-nickel alloy electrical resistance material vacuum deposited onto said facing surface in a uniform-thickness coating to form an electrically energizable heating unit, said heating unit forming, between any two spaced-apart areas thereof, a plurality of parallel electrical paths to provide high current distribution when electrically energized the electrical resistance of the individual paths varying linearly with its length, and a pair of electrical contacting devices coupled to said base element and movable along said coating material, for connecting therebetween said plurality of parallel electrical paths to provide uniform current distribution in each said plurality of parallel paths, said electrical contacting devices each including a clamping member, a layer of steel wool interposed between the clamping member and said resistance material for coupling electrically said clamping member to said resistance material to provide uniform and continuous electrical contact between said clamping member and all portions of said resistance material beneath the clamping member, for all positions of said clamping members to ensure the maintenance of the same number of resistance paths between the clamping members when the length therebetween of the resistance paths is altered to alter the energy level of the heating element, and fastening means for removably connecting said clamping members and said steel wool to said resistance material to enable the spacing between said clamping members to be altered to vary the heating effect of said resistance material.

References Cited in the file of this patent

UNITED STATES PATENTS

| | | |
|---|---|---|
| 1,743,888 | Hamister | Jan. 14, 1930 |
| 1,763,772 | Geloso | June 17, 1930 |
| 1,870,619 | Flanzer | Aug. 9, 1932 |
| 2,119,680 | Long | June 7, 1938 |
| 2,281,853 | Jira | May 5, 1942 |
| 2,288,235 | Foley | June 30, 1942 |
| 2,440,691 | Jira | May 4, 1948 |